Aug. 25, 1964 S. G. BAUER 3,146,172
MODERATOR FOR NUCLEAR REACTORS
Filed June 15, 1960 8 Sheets-Sheet 3

Aug. 25, 1964  S. G. BAUER  3,146,172
MODERATOR FOR NUCLEAR REACTORS
Filed June 15, 1960  8 Sheets-Sheet 6

Aug. 25, 1964    S. G. BAUER    3,146,172
MODERATOR FOR NUCLEAR REACTORS
Filed June 15, 1960    8 Sheets-Sheet 7

Aug. 25, 1964    S. G. BAUER    3,146,172
MODERATOR FOR NUCLEAR REACTORS
Filed June 15, 1960    8 Sheets-Sheet 8

Fig.12.

United States Patent Office 3,146,172
Patented Aug. 25, 1964

3,146,172
MODERATOR FOR NUCLEAR REACTORS
Stefan George Bauer, Hilton, England, assignor to Rolls-Royce Limited, Derby, England, a British company
Filed June 15, 1960, Ser. No. 36,371
Claims priority, application Great Britain June 19, 1959
28 Claims. (Cl. 176—42)

This invention comprises improvements in or relating to nuclear reactors.

According to the present invention, the moderator mass of a nuclear reactor comprises light water and a metal selected from the group comprising lead and magnesium. The selected metal may be in elemental form, or in alloy form, or in chemical compound form.

By employing a moderator mass in accordance with this invention a number of advantages may be obtained. Firstly, it is unnecessary to employ heavy water which is both expensive and scarce. Secondly, since light water has a short slowing down length, and lead and magnesium make only a small contribution to slowing down, it is possible by suitably selecting the relative quantities of light water and of lead or magnesium to arrange that the slowing down length of the moderator mass has a desired value. This has advantages in design, especially in design of small reactors, for instance by allowing use of cooling arrangements such as are employed in heavy water moderated reactors and by providing, as compared with reactors moderated by light water alone, adequate space between fuel elements for control elements. As an example, if the lead or magnesium occupies little more than half the volume of the space occupied by the lead or magnesium and the light water, slowing down parameters comparable with those of heavy water are obtained. Thirdly, where the moderator mass is lead/light water, the lead provides a good shielding effect against gamma rays so that the thickness of biological shielding around the reactor may be reduced.

According to a feature of this invention, the area ratio of the selected metal to light water in any cross-section of the reactor may be varied from region to region of the moderator mass. For example, the ratio may be reduced in the reflector region of the moderator mass as compared with the ratio in the core so as to reduce neutron leakage, or to obtain increased reflector efficiency. Also by a permanent variation of the ratio as between the reactor centre and the periphery of the moderator mass, some flux flattening can be obtained and other flux perturbations can be evened out.

According to another feature of this invention, a control system for a nuclear reactor having a moderator mass as above specified comprises means to vary the ratio of the selected metal to light water in the moderator mass. For instance, the lead or magnesium may be formed with internal passages and the control system may be arranged to vary the quantity of water in selected passages. The control system may also be used for flux flattening for instance by draining water from selected control passages.

Some arrangements according to this invention will now be described with reference to the accompanying drawings in which.

The reactor in each case is of the kind comprising a lattice of coolant conveying tubes in which fuel elements are inserted, but it will be understood, however, that the invention is applicable to other forms of reactor for instance to a pressurized water reactor using cooling water channels between fuel element channels, the space gained being employed for siting columns of water for control purposes. The fuel elements may be arranged in bundles, for instance as described in U.S. Serial No. 857,836, filed December 7, 1959, in my name, now Patent No. 3,096,264.

Figure 1:
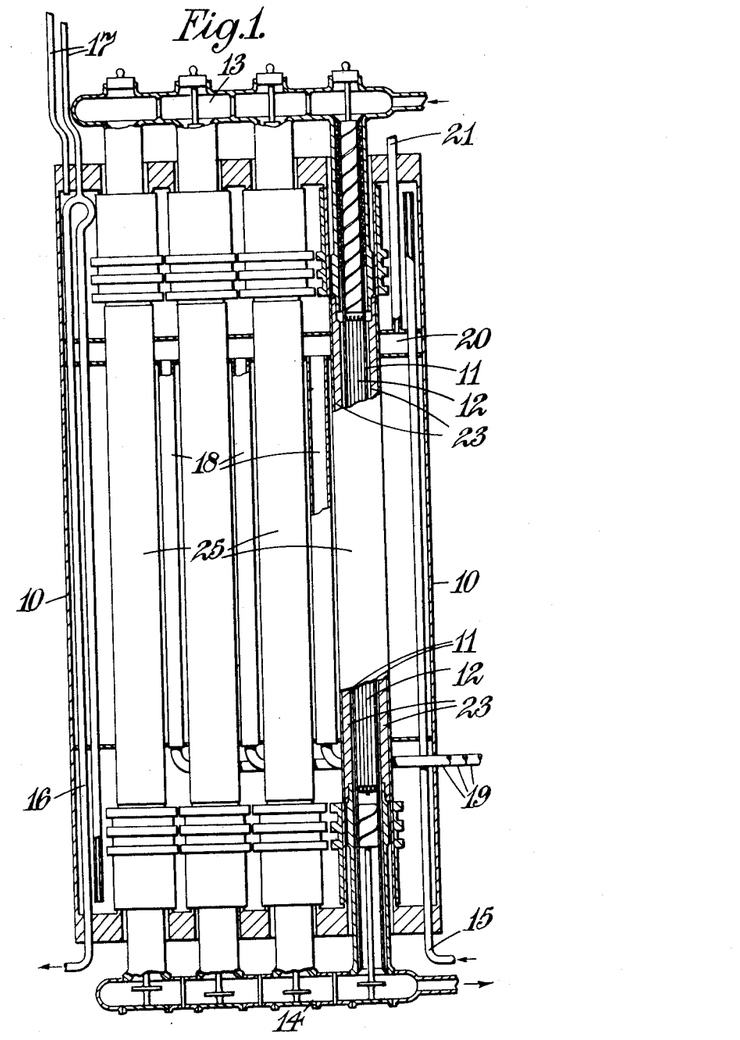
FIGURE 1 is a diagrammatic illustration of a form of reactor with which the arrangements of the invention may be used.

Referring to FIGURE 1, there is illustrated a steam cooled reactor employing a moderator mass in accordance with the invention.

The reactor comprises an aluminium calandria tank 10 through which a series of calandria tubes 11 extend to house fuel rod clusters 12. The fuel rods may be formed of uranium oxide housed in austenitic steel casings. Coolant steam is admitted to the tubes 11 from a header structure 13 and the steam leaving the tubes 11 is collected in a header structure 14.

Light water for the moderator mass and for end shielding is admitted to the tank 10 through pipe 15 and drawn off from the tank through siphon pipe 16. Connections 17 are taken from the tank to water header tanks (not shown).

Reactivity control is effected by providing within the tank 10 a series of control tubes 18 to which are connected pipes 19 through which light water can be delivered to or drawn off from the tubes 18 to vary the water level in the tubes. The upper ends of the tubes 18 open into a gas header 20 having a connection 21 so that an inert gas atmosphere can be maintained above the water in the tubes 18.

The moderator mass in the tank 10 in addition to light water comprises a mass of lead or magnesium 23..

The coolant tubes 11, the control tubes 18 and the lead or magnesium mass may be distributed in the horizontal cross-section in a variety of ways.

Figure 2:
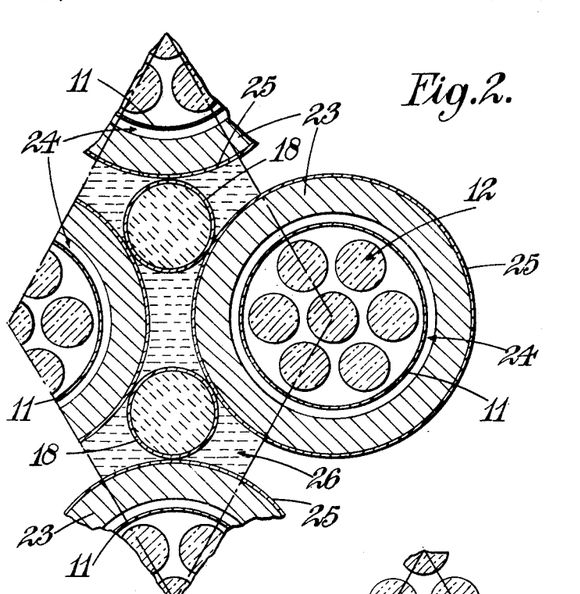
FIGURES 2, 3 and 4 are horizontal sections through three forms of lattice in a light water/magnesium or light water/lead moderated nuclear reactor.
Figure 5:
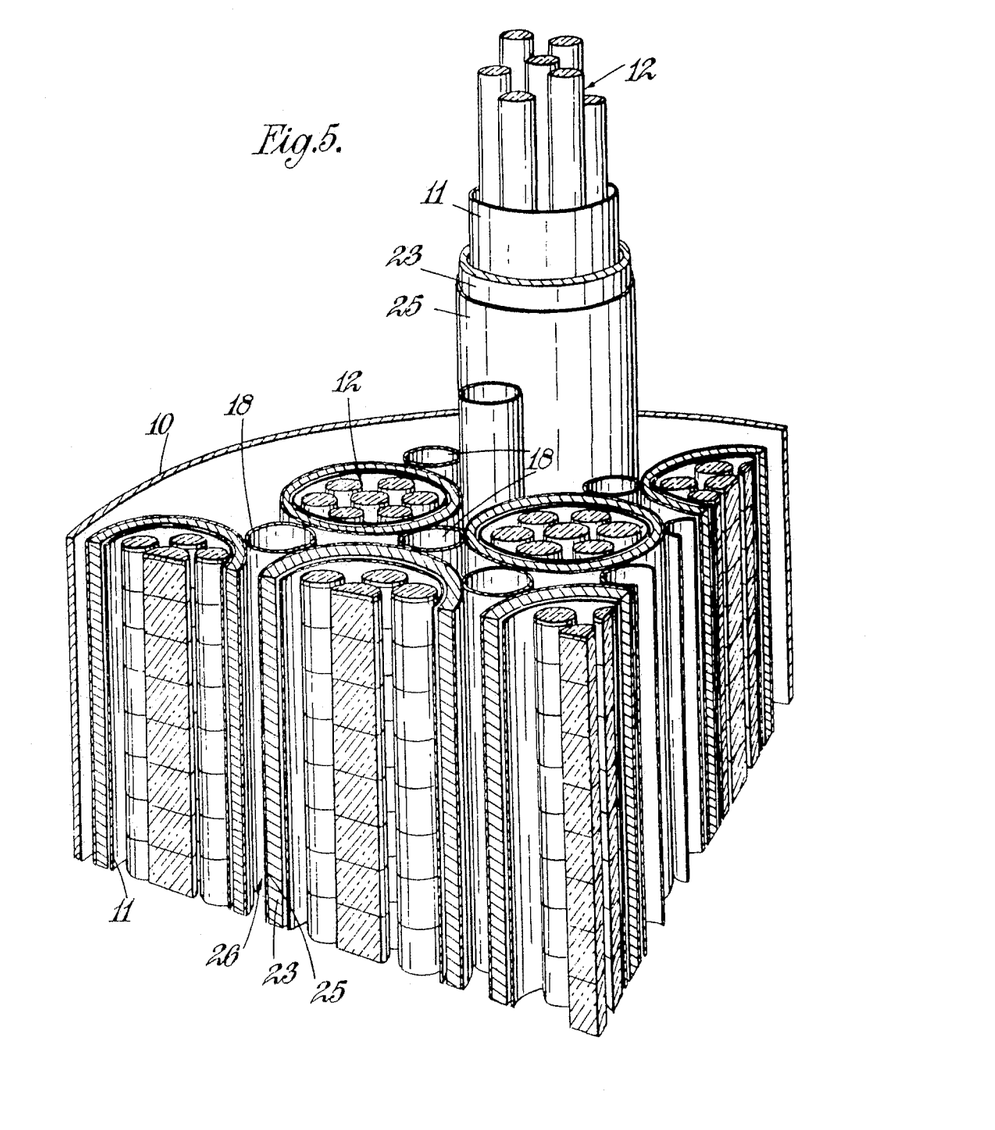
FIGURE 5 shows in perspective part of a reactor employing the lattice arrangement of FIGURE 2, FIGURE 6 to 8 are graphs illustrating effects of varying dimensions of parts shown in FIGURES 2 to 4, and FIGURES 9, 10, 11 and 12 are further horizontal sections through forms of lattice including a moderator mass according to the invention.

In FIGURES 2 and 5 each calandria tube 11 is enclosed in a thick tube 23 of lead or magnesium which has a thin aluminium sheath 25. The space 24 between the tubes 11 and 23 is filled with a barrier gas, e.g. helium or carbon dioxide.

The spaces 26 within the tank 10 but externally of the tubes 23 is occupied by light water, part of which is static water and part of which is water within the control tubes 18 which are of thin aluminium. Each control tube 18 is disposed at the centre of a group of three lead or magnesium tubes 23 and has a diameter as large as is permitted by the dimensions of the tubes 23.

Figure 6:
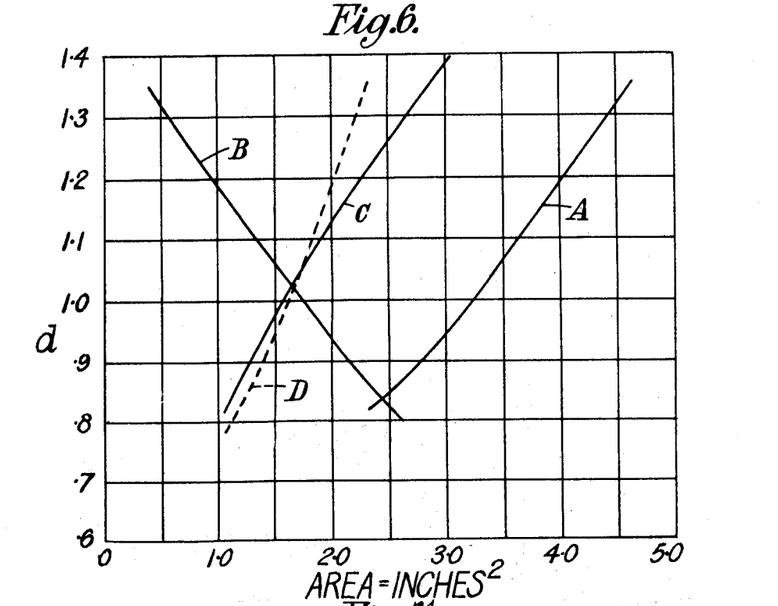

FIGURE 6 illustrates graphically the effect of varying the diameter $d$ of the control tubes 18 on the area of the lattice occupied by the lead or magnesium, and by the light water, the areas being those in a cross-section of the reactor in a plane at right angles to the tube axes. The total area associated with one calandria tube 11 is 9.477 in.$^2$ for a lattice pitch of 3.25 in. In this FIGURE, trace A represents the total water area, trace B the control water area and trace C the magnesium area. Trace D indicates half the total water area.

Figure 3:
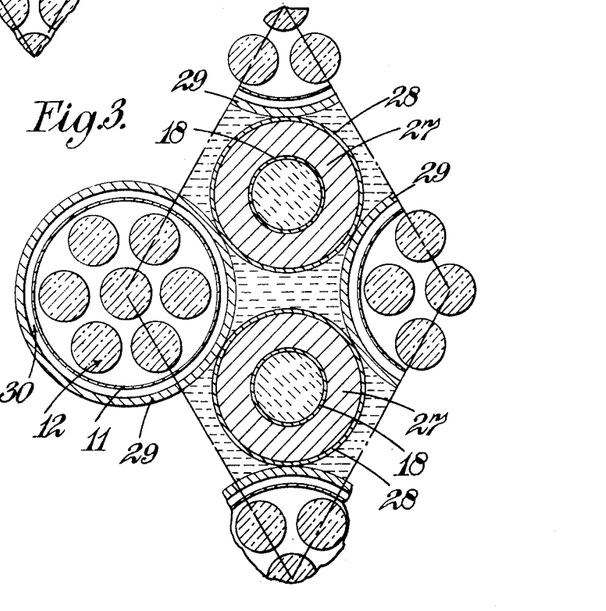
Figure 7:
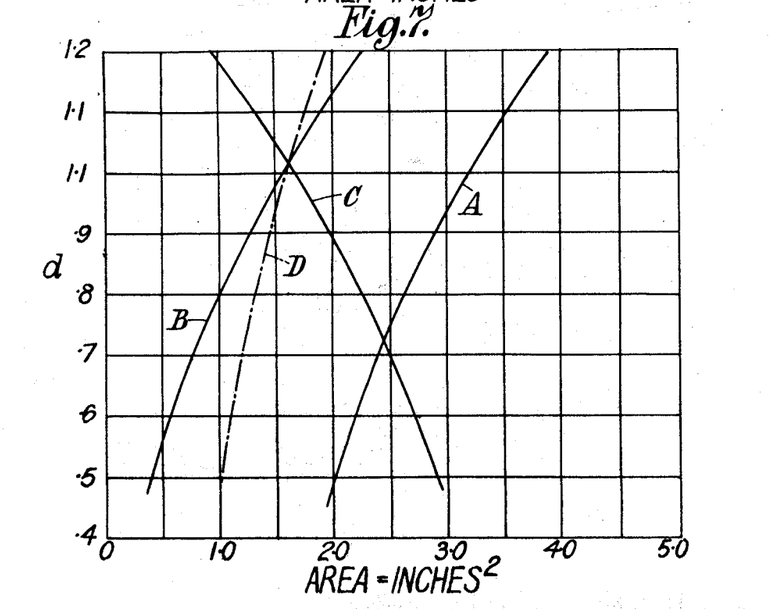

In FIGURE 3, the lead or magnesium does not surround the aluminium calandria tubes 11 but is in the form of tubes 27 surrounding the control tubes 18. The tubes 27 are again sheathed in aluminium 28 and the calandria tubes 11 are enclosed in thin aluminium tubes 29 to provide a barrier gas space 30. FIGURE 7 is a graph, corresponding to FIGURE 6, showing area variations for the arrangement of FIGURE 3.

Figure 4:
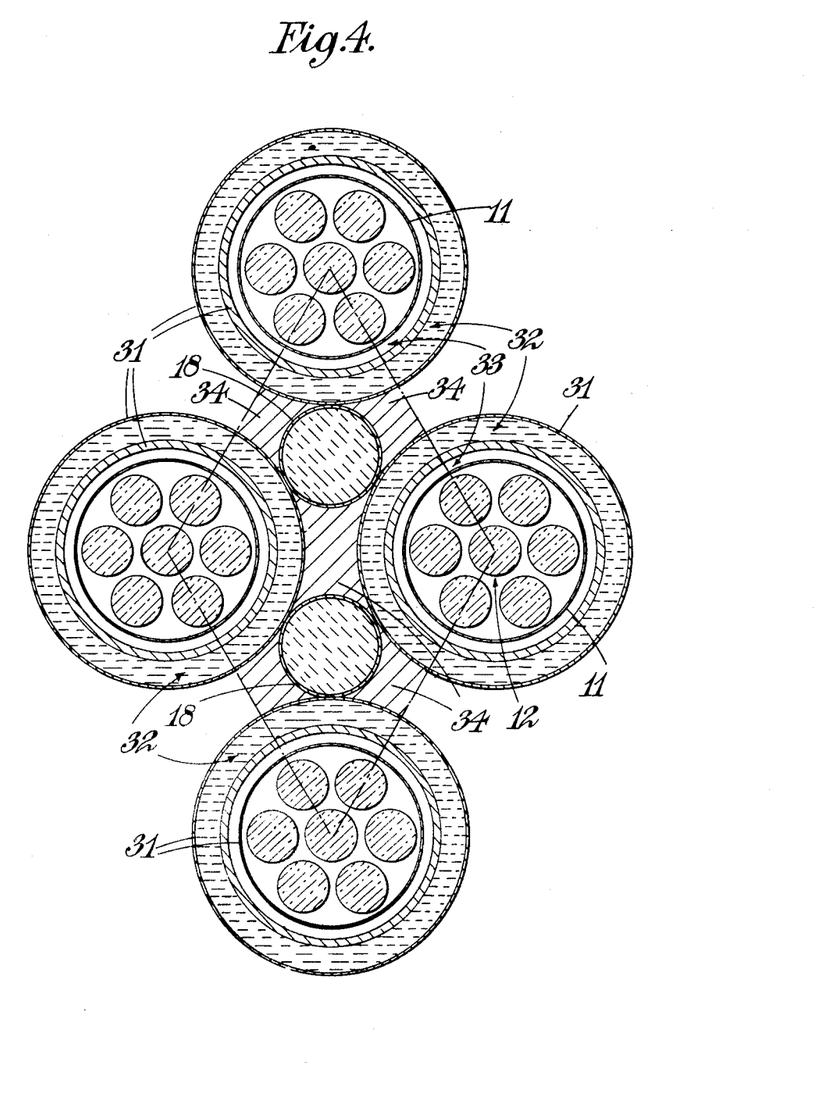
Figure 8:
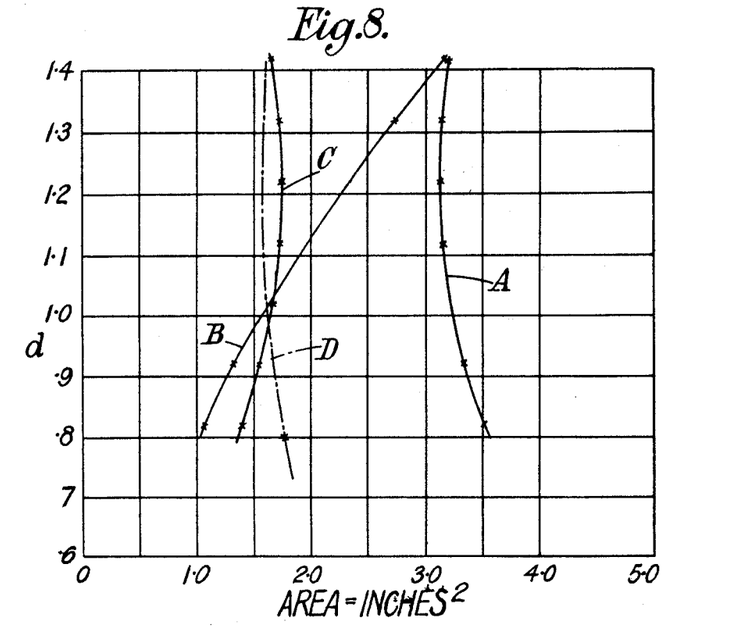

FIGURE 4 shows yet another arrangement in which the calandria tubes 11 are enclosed in double-walled aluminium tubes 31, the spaces between the walls being filled with light water 32, and the spaces between the tubes 31 are occupied by the control tubes 18 and by magnesium 34. 33 are barrier gas spaces. FIGURE 8 is a graph, corresponding to the graphs of FIGURES 6 and 7, for this arrangement.

Figure 9:
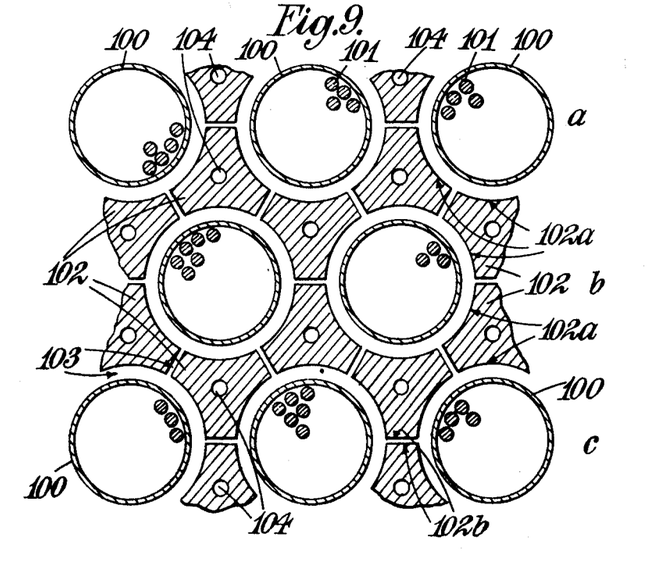

Referring now to FIGURE 9, the coolant tubes 100 accommodating fuel rod bundles 101 are arranged in rows $a$, $b$, $c$, the tubes in each row being offset with respect to the tubes in adjacent rows by half the pitch of the tubes in a row, and the spacing of the rows being such that the tubes are arranged in an equilateral triangle pattern, the centre of each tube being equidistant from the centres of the tubes surrounding it.

The moderator mass, comprising core and reflector of the reactor is formed by lead or magnesium blocks 102, each disposed between a group of three tubes 100, and light water. Each block is of basically triangular form but has its surfaces 102a curved about the axis of and spaced from the adjacent tube 100 and has its corners formed by flats 102b spaced from the flats of adjacent blocks 102. The spaces 103 between the blocks 102 and the tubes are filled with light water. The blocks 102 also have light water filled passages 104 running through them and selected ones of the passages 104 may form part of the control system of the reactor which operates by varying the quantity of light water in the selected passages 104.

Figure 10:
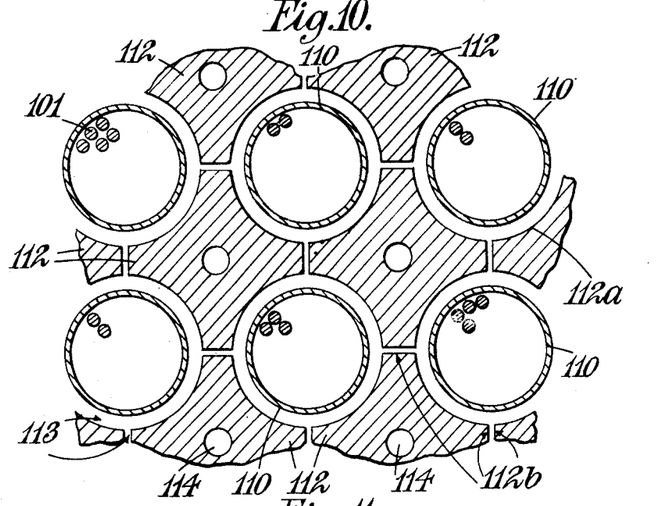

A similar arrangement is shown in FIGURE 10, but in this case the coolant tubes 110 are arranged on a square lattice and the blocks 112 having curved surfaces 112a and flats 112b are basically of square section. The spaces 113 are light water filled. The blocks 112 also have internal passages 114 which are light-water filled, some of the passages being employed for reactor control by varying the quantity of water in them.

Figure 11:
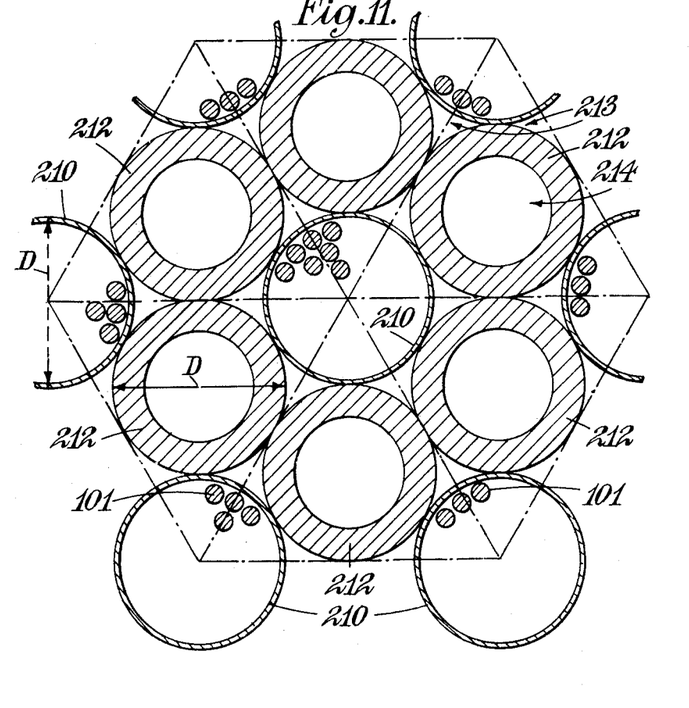

In FIGURE 11 the lead or magnesium of the moderator mass is in the form of tubes 212 having an external diameter equal to the external diameter of the coolant tubes 210. The coolant tubes 210 are arranged on an equilateral triangle lattice, the pitch of the tubes being $D\sqrt{3}$ where D is the external diameter of the tube. Each tube 212 within the reactor core is disposed between and touches three adjacent tubes 210. The spaces 213 between the tubes 210, 212 and the bores 214 of the tubes 212 contain light water, and the reactivity of the reactor may be controlled by varying the quantity of water within selected tubes 212 either in the reactor core or in the reflector mass which is also formed from light water and lead or magnesium, for example in the form of tubes 212.

Figure 12:
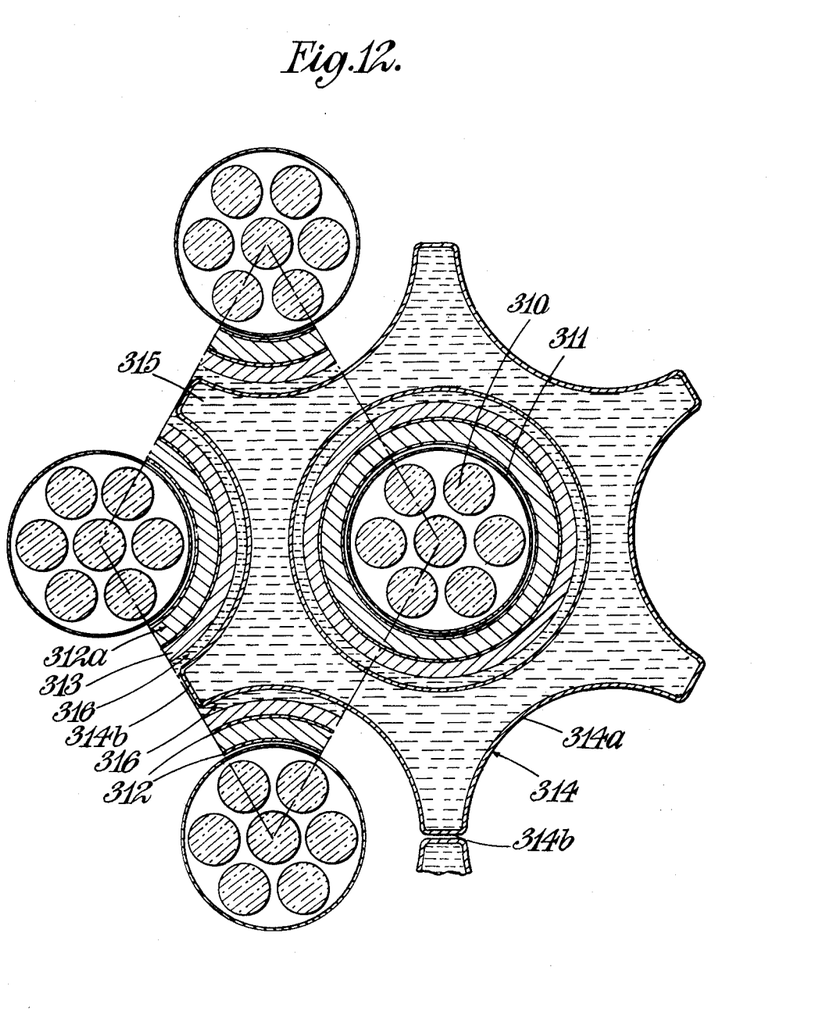

Referring now to FIGURE 12, the lattice shown comprises stainless steel barrier tubes 311 for housing the fuel rods 310 and to provide coolant passages. The tubes 311 are surrounded each by a double-walled magnesium (or magnesium alloy) tube 312, the space 312a between the walls of each tube 312 being filled with powdered magnesium oxide, and the tubes 312 are surrounded each by an aluminium tube 313. Some of the tubes 313 are surrounded by thin walled aluminium tubes 314 which are longitudinally fluted so as to have portions 314a co-axial with but spaced from the six adjacent tubes 312. The flutes 314a are joined by flats 314b which lie close to corresponding parts of adjacent tubes 314. The tubes 314 contain light water 315, the level of which may be varied to control the reactivity of the reactor, and the spaces 316 externally of the tubes 314 are also filled with light water. In this case, the selected metal of the moderator mass is partly in elemental form and partly in the form of a chemical compound, magnesium oxide.

In each of the above constructions the lead/light water ratio, or the magnesium/water ratio, is selected to give slowing down parameters suitable for the spacing of the fuel elements, but since light water is used as part of the moderator, the fuel elements will normally be required to have an increased fuel enrichment as compared with a heavy water moderated reactor having similar slowing down parameters. The slowing down parameters, such as slowing down length, may be calculated by standard methods, for example as given in Weinberg and Wigner "Theory of neutron chain reactors," Chicago University Press, 1958.

The surfaces of the lead or magnesium blocks or tubes which are exposed to water, are preferably clad in aluminium or other suitable material to prevent corrosion, the cladding material being selected to have a low neutron absorption. It will be seen that in each arrangement the aluminium area is only a small proportion of the total cross-sectional area of the lattice.

The moderator arrangement of this invention enables compact reactors to be designed, which have a fuel element spacing permitting the use of pressure tubes for coolant and providing adequate space for reactor control means, and avoids the use of heavy water which is expensive and scarce and requires a suitable handling system and also the use of associated helium handling systems. Also mechanical control rod systems are not necessary.

The present invention is especially suitable for reactors in which the moderator is at low temperature. The use of a low and constant temperature moderator system also makes the reactor suitable for plutonium fueling.

The drawings only illustrate part of the core of the reactor, but it will be understood that the reflector mass will normally be of a similar form to the core. However, the ratio of lead, or magnesium, to light water may be varied in the reflector as compared with the core for example to obtain flux flattening. The reflector mass may also incorporate the control means in the form of tubes which extend into the reflector mass and to which light water is fed in a controlled manner to vary the reactivity of the reactor. The control tubes may be arranged in groups, each group having an associated control system for feeding water to and draining water from them and thus to determine the water level in the group. These control tubes may be disposed in the reflector mass relative to the lead, or magnesium, blocks in a manner similar to the tubes 100, 110, 210 of FIGURES 9 to 11 or the tubes 18 of FIGURES 2 to 4.

I claim:

1. A nuclear reactor comprising a core, spaced fuel elements extending within the core, and a moderator material occupying the spaces between the fuel elements, said moderator material comprising masses incorporating a metal selected from the group consisting of lead and magnesium disposed within said core and occupying a first part of the space between and around the fuel elements, and light water occupying a second part of the space between and around the fuel elements, said fuel elements having a spacing substantially greater than the slowing down length of light water, and the ratio of the proportion of the moderator space occupied by the selected metal to the proportion of the moderator space occupied by the light water giving a slowing down length of the moderator material equivalent to the spacing of the fuel elements.

2. A nuclear reactor according to claim 1, comprising a lattice of coolant tubes housing said fuel elements, the selected metal forming part of the moderator mass being in the form of tubes of said metal encircling the coolant tubes, the spaces between the tubes of the selected metal constituting the said second part of the space between and around the fuel element.

3. A nuclear reactor according to claim 2, comprising also control tubes in the spaces between the tubes of the selected metal, the control tubes containing light water, the level of light water in the control tubes being variable.

4. A nuclear reactor according to claim 1, comprising a lattice of coolant tubes housing said fuel elements, the selected metal of the masses being in the form of tubes disposed in the spaces between the coolant tubes, the remaining spaces between the coolant and the tubes of the selected metal being filled with light water and the tubes of the selected metal containing light water.

5. A nuclear reactor according to claim 4, comprising means to vary the quantity of light water in the tubes of the selected metal.

6. A nuclear reactor according to claim 1 comprising a lattice of coolant tubes housing said fuel elements, and double-walled tubes surrounding the coolant tubes, the spaces defined by the double walls being filled with the light water, and the spaces externally of the double-walled tubes being occupied by the masses incorporating the selected metal.

7. A nuclear reactor according to claim 6, comprising light water containing control tubes extending in the spaces externally of the double-walled tubes, the quantity of light water in the control tubes being variable.

8. A nuclear reactor according to claim 1, comprising a lattice of coolant tubes housing said fuel elements, the spaces between the coolant tubes being occupied by shaped blocks of the selected metal and by the light water.

9. A nuclear reactor according to claim 8, wherein the blocks have bores extending through them, the bores containing light water, the quantity of light water in the bores being variable.

10. A nuclear reactor according to claim 1, wherein the selected metal is in alloy form.

11. A nuclear reactor according to claim 1 the said masses including double-walled tubes, the spaces between the double-walls being filled with a powdered compound of the selected metal, and the light water surrounding the double-walled tubes.

12. A nuclear reactor according to claim 11, wherein the double-walled tubes are formed from the selected metal in elemental form.

13. A nuclear reactor according to claim 12, wherein the selected metal is magnesium and the powdered compound is magnesium oxide.

14. A nuclear reactor according to claim 11 including coolant tubes housing said fuel elements, the double-walled tubes surrounding the coolant tubes.

15. A nuclear reactor according to claim 11 comprising control tubes containing light water, some at least of the double-walled tubes being surrounded by the control tubes, and the light water level in the control tubes being variable to vary the reactivity of the reactor.

16. A nuclear reactor according to claim 15, wherein the control tubes are longitudinally fluted to have portions co-axial with but spaced from the adjacent double-walled tubes.

17. A nuclear reactor according to claim 11, wherein the double-walled tubes are formed from an alloy containing the selected metal.

18. A nuclear reactor according to claim 1, the moderator material having a first region within the core in which the area ratio of the selected metal to light water in any cross-section has a first value, and having a second region around the first region in which said ratio has a second and lower value.

19. A nuclear reactor according to claim 18, comprising a reflector mass around the core, said ratio in the reflector region being smaller than said ratio in the core.

20. A nuclear reactor according to claim 18, comprising means to vary the value of said ratio.

21. A nuclear reactor according to claim 20, wherein the mass incorporating the selected metal has internal passages and said means to vary the value of said ratio is effective to vary the quantity of water in some at least of said passages.

22. A nuclear reactor according to claim 1, wherein the selected metal is in chemical compound form.

23. A nuclear reactor according to claim 1, wherein the selected metal occupies a proportion of the moderator space selected to give slowing down parameters of the moderator material equivalent to the slowing down parameters of heavy water.

24. A nuclear reactor according to claim 1 wherein said metal occupies slightly more than half the volume of the space occupied by the metal and the light water so that there is produced a moderator mass having a slowing down length comparable with that of heavy water.

25. A nuclear reactor comprising a calandria tank, a lattice of coolant conveying tubes extending through the tank, fuel elements in the coolant conveying tubes, and moderator material within said tank and surrounding the tubes, said moderator material comprising masses of a metal selected from the group consisting of lead and magnesium disposed within the lattice of tubes and occupying part of the space between the tubes, light water in the remaining space between said tubes, said lattice having a coolant tube spacing substantially greater than the slowing down length of light water, and the ratio of the part of the space occupied by the selected metal to the part of the space occupied by the light water giving a slowing down length of the moderator material equivalent to the spacing of the tubes.

26. A nuclear reactor comprising a lattice of spaced fuel channels, fuel elements in said channels and a moderator in the spaces between and surrounding said fuel channels, said moderator comprising masses of a metal selected from the group consisting of lead and magnesium, said masses of metal occupying a first part of the spaces between and surrounding the fuel channels, and light water occupying a second part of the spaces between and surrounding the fuel channels, and said lattice having a fuel channel spacing substantially greater than the slowing down length of light water, and the ratio of the part of the space occupied by the selected metal to the part occupied by the light water giving a slowing down length of the moderator corresponding to the spacing of the fuel channels.

27. A nuclear reactor comprising a calandria tank, a lattice of spaced coolant tubes extending through the tank, fuel elements accommodated within the coolant tubes, a plurality of tubes of a metal selected from the group consisting of lead and magnesium, each such tube of a selected metal being co-axial with and surrounding a corresponding one of the coolant tubes, and light water occupying the spaces between the tubes of the selected metal, said selected metal and the light water being present in proportions such that their effective slowing down length is substantially greater than that of light water alone and said coolant tubes having a spacing in said lattice dependent on said effective slowing down length.

28. A nuclear reactor according to claim 27 comprising also control tubes within the spaces between said tubes of the selected metal, said control tubes containing a proportion of the light water, and means to vary the quantity of light water within the control tubes.

References Cited in the file of this patent

UNITED STATES PATENTS

| | | |
|---|---|---|
| 2,810,689 | Wigner et al. | Oct. 22, 1957 |
| 2,825,689 | Szilard et al. | Mar. 4, 1958 |
| 2,929,768 | Mahlmeister et al. | Mar. 22, 1960 |
| 2,977,297 | Evans et al. | Mar. 28, 1961 |
| 2,982,713 | Sankovich et al. | May 2, 1961 |
| 2,999,059 | Treshow | Sept. 5, 1961 |
| 3,071,527 | Young | Jan. 1, 1963 |
| 3,093,563 | Menke | June 11, 1963 |

OTHER REFERENCES

Atomic Energy Commission Document: TID–7532 (Pt. I), Reactor Control Meeting Held in Los Angeles, March 6–8, 1957, issued October 1957, pp. 188–201.